United States Patent [19]

Chiba et al.

[11] Patent Number: 4,968,569
[45] Date of Patent: Nov. 6, 1990

[54] SECONDARY BATTERY

[75] Inventors: Kazuyuki Chiba, Yamato; Ken-ichi Takahashi; Hajime Sudo, both of Machida; Masanori Ichida, Ebina; Tomoyuki Akiyama, Yokohama, all of Japan

[73] Assignee: Tosoh Corporation, Shinnanyo, Japan

[21] Appl. No.: 472,054

[22] Filed: Jan. 31, 1990

[30] Foreign Application Priority Data

Jan. 31, 1989 [JP] Japan ................................. 1-19838

[51] Int. Cl.$^5$ ............................................. H01M 4/36
[52] U.S. Cl. .................................. 429/229; 429/188; 429/224; 429/245
[58] Field of Search ............... 429/245, 224, 229, 230, 429/231, 188

[56] References Cited

U.S. PATENT DOCUMENTS

| | | | |
|---|---|---|---|
| 2,193,782 | 3/1940 | Smith | 429/245 |
| 3,447,971 | 6/1969 | Ammerman | 429/188 |
| 3,785,868 | 1/1974 | Devitt | 429/230 |
| 4,025,699 | 5/1977 | Silva et al. | 429/188 X |
| 4,048,408 | 9/1977 | Lala | 429/229 |
| 4,091,178 | 5/1978 | Kordesch | 429/224 X |
| 4,121,024 | 10/1978 | Turillon et al. | 429/245 |
| 4,125,638 | 11/1978 | Watanabe et al. | 429/245 X |
| 4,328,297 | 5/1982 | Bilhorn | 429/245 X |
| 4,451,543 | 5/1984 | Dzieciuch et al. | 429/229 X |

*Primary Examiner*—Anthony Skapars
*Attorney, Agent, or Firm*—Foley & Lardner, Schwartz, Jeffery, Schwaab, Mack, Blumenthal & Evans

[57] ABSTRACT

A secondary battery which comprises a positive-electrode material, an electrolyte solution, a negative-electrode material comprising zinc, and a negative-electrode substrate made of lead or a lead alloy. In a modification, the negative-electrode substrate is made of an electro-conductive material, with the surface thereof being coated with lead or a lead alloy. The battery is free from dendrite short-circuit and has an improved cycle life.

15 Claims, No Drawings

SECONDARY BATTERY

BACKGROUND OF THE INVENTION

The present invention relates to a secondary battery which employs zinc as a negative-electrode material.

Batteries are widely used as a power source for electronic and electric apparatuses. The recent trends towards miniaturization, higher performance, portability, and personal use of electronic and electric apparatuses have brought about increased demand for secondary batteries which are suitable for long term use and yet are economical.

For use in technical fields, nickel-cadmium and alkali-zinc secondary batteries have been investigated. In particular, alkali-zinc secondary batteries which employ zinc as the negative-electrode material have the advantages of high energy density and economically low cost.

However, secondary batteries employing zinc as the negative-electrode material have disadvantages, including deterioration of the zinc electrode by repetition of charge and discharge and short cycle life.

The causes of the deterioration of the characteristics of the zinc electrode with the repetition of charge and discharge are considered as below. The zinc electrode tends to dissolve unevenly during discharge because of delicate non-uniformity of the surface state, so that the surface roughness of the zinc electrode will increase with the progress of the discharge, and the zinc electrode will come to be deformed. During charge, zinc deposits in a form of a tree-branch (which is called a dendrite) on the projected portion. The dendrite will grow toward the positive electrode with the repetition of charge-discharge cycles, the deposited zinc finally penetrating the separator to cause internal short-circuit, or dendrite short-circuit.

SUMMARY OF THE INVENTION

Accordingly, it is an object of the present invention to provide an aqueous secondary battery employing zinc as a negative-electrode material which is free from dendrite short-circuit and has a long life cycle.

In accomplishing the foregoing and other objectives, there has been provided, in accordance with one aspect of the present invention, a secondary battery which comprises a positive-electrode material, an electrolyte solution, a negative-electrode material comprising zinc, and a negative-electrode substrate made of lead or a lead alloy.

In accordance with another aspect of the present invention, there is provided a secondary battery which comprises a positive-electrode material, an electrolyte solution, a negative-electrode substrate made of an electro-conductive material, with the surface thereof coated with lead or lead alloy.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The inventors of the present invention conducted comprehensive investigation to solve the aforementioned problems. As the result, the inventors found that the use of lead or lead alloy as the substrate could solve the above problems in a secondary battery which comprises a positive-electrode material, for example manganese dioxide, an electrolyte solution, for example an aqueous zinc sulfate solution, and zinc as a negative-electrode material, the negative electrode being constituted of a substrate for releasing and accepting the electrons necessary for oxidizing (or dissolving) and reducing (or depositing) the zinc on discharge and charge of the battery from the outside, and zinc as the negative-electrode material coating the substrate, and thus accomplished the present invention.

The present invention provides a secondary battery which comprises a positive-electrode material, an electrolyte solution, a negative-electrode material comprising zinc, and a negative-electrode substrate made of lead or lead alloy.

The lead or lead alloy, when used for the negative-electrode substrate according to the present invention, forms an alloy together with the zinc on oxidation (dissolution)-reduction (deposition) at discharge-charge of the battery. The alloy phase thus formed will bond strongly to the negative-electrode substrate, reducing the exfoliation of the deposited zinc to a minimum, and further controlling the crystal orientation of the zinc depositing at the successive charge (reduction) to allow uniform deposition of zinc to retard roughening of the zinc electrode surface. Thus the growth of dendrite is suppressed, and dendrite-short-circuit is prevented. Accordingly, the long cycle life of the secondary battery is considered to be due to the suppression of growth of the dendrite and the resulting prevention of the dendrite short-circuit.

The lead or the lead alloy used as the negative-electrode substrate of the secondary battery of the present invention includes simple lead, and binary and ternary alloys of lead with one or more of tin, indium, bismuth, silver, calcium, and antimony. The use of the lead alloy is preferable since it retards collapse of the negative-electrode substrate which is caused by repeated charge-discharge. When the lead alloy is used, it preferably contains a metal or metals other than lead in an amount of not more than about 5% by weight from the standpoint of processability of the negative-electrode substrate. At the content of a metal or metals other than lead exceeding about 5% by weight, the reversibility of dissolution-deposition may be lowered.

As the negative-electrode substrate, the use of an electro-conductive material coated with lead or a lead alloy can also prevent the above-mentioned dendrite short-circuit. Since the electro-conductive material is malleable and ductile, the substrate may easily be worked previously into a desired form such as a thin plate, a sponge, or a mesh. In particular, a substrate worked into a spiral form may give a negative-electrode substrate of a battery having a spring elasticity. Any electro-conductive material may be used therefor. The examples thereof include iron and iron alloys such as stainless steel, high-carbon steel, etc.; nickel and nickel alloys such as Monel metal, Hastelloy, Inconel, etc.; copper and copper alloys such as brass, cupro nickel, etc.; and carbon and electroconductive polymers mainly constituted of carbon such as polyaniline, polypyrrol, carbon fiber, etc.

The negative-electrode substrate constituted of an electro-conductive material coated with lead or a lead alloy may be produced by plating the electro-conductive material with lead or a lead alloy employing a lead ion-containing aqueous solution; by contact bonding lead or a lead alloy at the surface of the electro-conductive material; by sputtering lead or a lead alloy onto the surface of the electro-conductive material; or in a like manner.

In the case where the surface of the electro-conductive material is plated with lead or a lead alloy employing a lead-ion-containing aqueous solution, the electro-conductive material previously worked into a thin plate, a sponge, a mesh, etc. is cut into a desired shape and is connected to the negative pole (−) of a DC power source, while a piece of lead cut into a predetermined shape is connected to the positive pole (+) of the DC power source. These are immersed in an aqueous solution containing lead ion to conduct electroplating. Any aqueous solution containing lead ion may be used for this purpose. Examples include solutions of lead fluoborate, lead sulfamate, lead sulfate, etc. in pure water which preferably further contain fluoboric acid, boric acid, peptone, or the like dissolved therein for smoothing the surface of the plated lead. The concentrations, although not limited specifically, are preferably from about 90 to 100 g/l for lead fluoborate, from about 60 to 80 g/l for fluoboric acid, from about 20 to 30 g/l for boric acid, and about 0.5 g/l for peptone. The lead connected to a DC power source is preferably to be cut to have an area at least about twice that of the electro-conductive material, and has a purity of not less than about 98.5%. The electroplating is preferably conducted at a temperature of from about 25° to 30° C. and at a current density of from about 15 to 30 mA/cm$^2$. The thickness of the lead plating is not particularly limited insofar as the negative-electrode substrate is coated closely. The negative-electrode substrate is electroplated with lead alloy in an aqueous solution containing lead ion together with a desired amount of tin, indium, bismuth, silver, calcium, antimony, etc.

The negative-electrode substrate of the secondary battery of the present invention is preferably immersed in a mixture of acetic anhydride and hydrogen peroxide (mixing ratio of about 3:1 by volume) for removing any oxide film covering the surface of the lead or the lead alloy, and further is washed with water or acetone for fat removal.

The zinc is formed into the negative-electrode of the secondary battery of the present invention in a manner such that zinc ion in an aqueous solution is electrolytically reduced to be deposited onto the surface of a negative-electrode substrate composed of lead or a lead alloy or of a negative-electrode substrate coated with lead or a lead alloy (hereinafter simply referred to as "a negative-electrode substrate"); that zinc in sheet form is placed on the surface of a negative-electrode substrate; or that granular zinc is mixed with a suitable binder and a suitable electroconductive material into a paste and then applied and dried on the surface of a negative-electrode substrate.

Of these methods, in the case where zinc ion in an aqueous solution is electrolytically reduced to be deposited onto the surface of a negative-electrode substrate, the electroplating is conducted at a constant electric current with the negative-electrode substrate connected to the negative pole (−) of a DC power source and immersed in an aqueous solution containing zinc ion, and with the counter electrode connected to the positive pole (+) of the DC power source and immersed in the same aqueous solution containing zinc ion. The aqueous solution containing zinc ion employed in this method is prepared by dissolving a zinc salt, such as zinc sulfate, zinc chloride, zinc acetate, zinc nitrate, etc. in purified water at a concentration in the range of from about 10 mM to saturation. The zinc salt is preferably zinc sulfate which is identical with the electrolyte constituting the battery since the anion of the salt may be enclosed by the deposited zinc. The concentration is preferably in the range of from about 0.5 to 2M for a high degree of uniformity of zinc and low conductivity of the electrolyte. The counter electrode in the electrolytic deposition is preferably made of zinc so as to keep the zinc concentration unchanged during the electrolysis. The zinc preferably has a purity of not less than about 99.9% to avoid contamination by an impurity.

The electrolysis for depositing zinc may be conducted by constant-current electrolysis, constant-voltage electrolysis, pulse electrolysis, or voltage-sweeping electrolysis. Constant-current electrolysis, allowing easy control of the quantity of electricity, and constant-voltage electrolysis, causing less side reactions, are particularly preferred. In the constant-current electrolysis, the current is preferably in the range of from about 0.1 to 100 mA/cm$^2$ for compactness of the deposited zinc and smoothness of the surface thereof. In the constant-voltage electrolysis, the applied voltage is in the range of from about −0.01 to −1.0 V relative to the zinc electrode for compactness of the deposited zinc and smoothness of the surface thereof. The amount of the zinc to be deposited is preferably about 0.5 to 5 times that of the manganese dioxide, which is a positive-electrode material, in electricity equivalence for the purpose of providing sufficient battery capacity. In the case where zinc in sheet form is placed on the surface of the negative-electrode substrate, the sheet-form zinc preferably has a purity of not less than about 99%. In the case where granular zinc is mixed with a suitable binder and a suitable electroconductive material agent are respectively not more than about 5% of the zinc. The zinc which is used as a negative-electrode material is most preferably one deposited by electrolysis in view of the activity of zinc, the effective surface area of zinc and so on.

The manganese dioxide which is used as the positive-electrode material is exemplified by natural manganese dioxide, chemical manganese dioxide, and electrolytic manganese dioxide, of which the electrolytic manganese dioxide is preferable because of high activity as a positive-electrode material. While such manganese dioxide may be used by itself, it is preferably used as a mixture with electroconductive carbon powder such as acetylene black, by which electroconductivity and electrolyte stability are improved. The positive-electrode material may be press-molded into a positive electrode, or may be mixed with a binder to form a thin film by screen printing or the like and to form it into a desired shape of the positive electrode.

In the aqueous solution of zinc sulfate which is used as the electrolyte solution of the secondary battery of the present invention, the zinc sulfate as the electrolyte is not particularly limited. However, the purity thereof is preferably not less than about 99%. This has the advantages that it is easily handled and is stable because water is used as the solvent. Furthermore, the electrolyte solution exhibits a high electroconductivity, giving excellent dischargeability of the secondary battery.

The present invention is described in more detail by referring to examples without limiting it in any way.

EXAMPLE 1

Lead having a thickness of 0.1 mm and a purity of 99.8% was used as the negative-electrode substrate. The surface was polished with #1500 sandpaper. Then the lead substrate was immersed in a mixture of acetic anhydride and acetone in a volume ratio of 3:1, and washed with water and acetone to remove fat. The substrate was adjusted to have a surface area of 12 cm$^2$, and immersed in aqueous 2M zinc sulfate solution. By using a zinc plate having 99.9% purity as the counter electrode, a constant electric current of 60 mA was made to flow between the electrodes for 15 hours to deposit zinc on the surface of the lead substrate, thus providing a negative electrode. The electrolysis efficiency of zinc was calculated from the weight increase of lead given by the electrolytic zinc deposition, which shows that 900 mAH of zinc was contained and the deposition of zinc was nearly quantitative. A separator of filter paper made of glass fiber and a positive-electrode compound consisting of 1.0 g to electrolytic manganese dioxide and 0.1 g of acetylene black were placed on the negative electrode. 3 ml of aqueous 2M zinc sulfate solution was dropped and impregnated thereto as the electrolyte solution, thus forming a battery.

The battery prepared as above was subjected to a discharge test at a constant current discharge of 50 mA and at 25° C. The discharge voltage at the start was 1.55 V, and the discharge was stopped when the discharge voltage fell to 0.3 V. After the discharge, the battery was charged at a constant current of 50 mA to a charging voltage of 1.9 V. This operation of discharge-charge is defined as one cycle. The battery was tested for cycle life to examine the change of the battery capacity with repetition of the cycles. Table 1 shows the results.

EXAMPLE 2

A negative electrode was prepared by depositing zinc on the surface of the lead alloy substrate in the same manner as in Example 1 except that a lead alloy 0.3 mm thick containing 5% by weight of indium was used as the negative-electrode substrate. The electrolysis efficiency of zinc was calculated from the weight increase of lead alloy given by the electrolytic zinc deposition, which shows that 900 mAH of zinc was contained and the deposition of zinc was nearly quantitative. A battery was prepared with this negative electrode and with the separator, the positive-electrode compound and the electrolyte solution identical with the ones used in Example 1.

The battery was tested for cycle life under the same conditions as in Example 1 to examine the change of the battery capacity with repetition of the cycles. Table 1 shows the results collectively.

EXAMPLE 3

A negative electrode was prepared by depositing zinc on the surface of the lead alloy substrate in the same manner as in Example 1 except that a lead alloy 0.3 mm thick containing 2% by weight of tin and 3% by weight of bismuth was used as the negative-electrode substrate. The electrolysis efficiency of zinc was calculated from the weight increase of lead alloy given by electrolytic zinc deposition, which shows that 900 mAH of zinc was contained and the deposition of zinc was nearly quantitative. A battery was prepared with this negative electrode and with the separator, the positive-electrode compound and the electrolyte solution identical with the ones used in Example 1.

The battery was tested for cycle life under the same conditions as in Example 1 to examine the change of the battery capacity with repetition of the cycles. Table 1 shows the results collectively.

EXAMPLE 4

A negative electrode was prepared by depositing zinc on the surface of the lead alloy substrate in the same manner as in Example 1 except that a lead alloy 0.3 mm thick containing 2% by weight of tin, 1% by weight of indium, and 1% by weight of silver was used as the negative-electrode substrate. The electrolysis efficiency of zinc was calculated from the weight increase of lead alloy given by the electrolytic zinc deposition, which shows that 900 mAH of zinc was contained and the deposition of zinc was nearly quantitative. A battery was prepared with this negative electrode and with the separator, the positive-electrode compound and the electrolyte solution identical with the ones used in Example 1.

The battery was tested for cycle life under the same conditions as in Example 1 to examine the change of the battery capacity with repetition of the cycles. Table 1 shows the results collectively.

EXAMPLE 5

A negative electrode was prepared by depositing zinc on the surface of the lead alloy substrate in the same manner as in Example 1 except that a lead alloy 0.3 mm thick containing 4% by weight of antimony was used as the negative-electrode substrate. The electrolysis efficiency of zinc was calculated from the weight increase of lead alloy given by the electrolytic zinc deposition, which shows the 900 mAH of zinc was contained and the deposition of zinc was nearly quantitative. A battery was prepared with this negative electrode and with the separator, the positive-electrode compound and the electrolyte solution identical with the ones used in Example 1.

The battery was tested for cycle life under the same conditions as in Example 1 to examine the change of the battery capacity with repetition of the cycles. Table 1 shows the results collectively.

EXAMPLE 6

A negative electrode was prepared by depositing zinc on the surface of the lead alloy substrate in the same manner as in Example 1 except that a lead alloy 0.3 mm thick containing 0.03% by weight of calcium was used as the negative-electrode substrate. The electrolysis efficiency of zinc was calculated from the weight increase of lead alloy given by the electrolytic zinc deposition, which shows that 900 mAH of zinc was contained and the deposition of zinc was nearly quantitative. A battery was prepared with this negative electrode and with the separator, the positive-electrode compound and the electrolyte solution identical with the ones used in Example 1.

The battery was tested for cycle life under the same conditions as in Example 1 to examine the change of the battery capacity with repetition of the cycles. Table 1 shows the results collectively.

EXAMPLE 7

A sheet of SUS 430 stainless steel 0.3 mm thick, which had been adjusted to have an area of 12 cm$^2$, was connected to the negative pole (−) of a DC power source. A plate of lead having a purity of 98.5%, which had been adjusted to have an area of 24 cm$^2$, was connected to the positive pole (+) of the DC power source. These plates were immersed in an aqueous solution containing 90 g/l of lead fluoborate, 60 g/l of fluoboric acid, 30 g/l of boric acid, and 0.5 g/l of peptone dissolved in pure water, and electroplating was conducted at a temperature of 25° C. at current density of 25 mA/cm$^2$ for 1.5 hours, giving a negative-electrode substrate electroplated with lead of approximately 130 microns thickness. This substrate was immersed in a mixed solution containing acetic anhydride and hydrogen peroxide in a volume ratio of 3:1, and was further washed with water and acetone to remove fat therefrom. The substrate was immersed in aqueous 2M zinc sulfate solution. By using a zinc plate having 99.9% purity as the counter electrode, a constant electric current of 60 mA was made to flow between the electrodes of 15 hours to deposit zinc on the surface of the lead-plated SUS 430 stainless steel thus providing a negative electrode. The electrolysis efficiency of zinc was calculated from the weight increase of the negative-electrode substrate of the lead-plated SUS 430 stainless steel sheet given by the electrolytic zinc deposition, which shows that 900 mAH of zinc was contained and the deposition of zinc was nearly quantitative. A separator of filter paper made of glass fiber and a positive-electrode compound consisting of 1.0 g of electrolytic manganese dioxide and 0.3 g of acetylene black were placed on the negative electrode. 3 ml of an aqueous 2M zinc sulfate solution was dropped and impregnated thereto as the electrolyte solution, thus forming a battery.

The battery was tested for cycle life under the same conditions as in Example 1 to examine the change of the battery capacity with repetition of the cycles. Table 1 shows the results collectively.

EXAMPLE 8

Pure nickel in sponge form 0.5 mm thick, which had been adjusted to have an area of 12 cm$^2$, was connected to the negative pole (−) of a DC power source. A plate of lead having a purity of 98.5%, which had been adjusted to have an area of 24 cm$^2$, was connected to the positive pole (+) of the DC power source. These were immersed in an aqueous solution containing 100 g/l of lead fluoborate, 80 g/l of fluoboric acid, 20 g/l of boric acid, and 0.5 g/l of peptone dissolved in pure water, and electroplating was conducted at a temperature of 25° C. at current density of 15 mA/cm$^2$ for 2.5 hours, giving a negative-electrode substrate electroplated with lead of approximately 30 microns thickness. On the surface of this substrate, zinc was deposited in the same manner as in Example 7 to provide a negative electrode. The electrolysis efficiency of zinc was calculated form the weight increase, given by the electrolytic zinc deposition, of the negative-electrode substrate of lead-plated pure nickel, which shows that 900 mAH of zinc was contained and the deposition of zinc was nearly quantitative. A battery was prepared with this negative electrode and with the separator, the positive-electrode compound, and the electrolytic solution identical with the ones used in Example 7.

The battery was tested for cycle life under the same conditions as in Example 1 to examine the change of the battery capacity with repetition of the cycles. Table 1 shows the results collectively.

EXAMPLE 9

Brass in mesh form 0.3 mm thick, which had been adjusted to have an area of 12 cm$^2$, was connected to the negative pole (−) of a DC power source. A plate of lead having a purity of 98.5%, which had been adjusted to have an area of 24 cm$^2$, was connected to the positive pole (+) of the DC power source. These plates were immersed in an aqueous solution containing 95 g/l of lead fluoborate, 70 g/l of fluoboric acid, 25 g/l of boric acid, and 0.5 of peptone dissolved in pure water, and electroplating was conducted at a temperature of 25° C. at a current density of 30 mA/cm$^2$ for 2.5 hours, giving a negative-electrode substrate electroplated with lead of approximately 90 microns thickness. On the surface of this substrate, zinc was deposited in the same manner as in Example 7 to provide a negative electrode. The electrolysis efficiency of zinc was calculated from the weight increase of the negative-electrode substrate of lead-plated brass given by the electrolytic zinc deposition, which shows that 900 mAH of zinc was contained and the deposition of zinc was nearly quantitative. A battery was prepared with this negative electrode and with the separator, the positive-electrode compound, and the electrolytic solution identical with the ones used in Example 7.

The battery was tested for cycle life under the same conditions as in Example 1 to examine the change of the battery capacity with repetition of the cycles. Table 1 shows the results collectively.

EXAMPLE 10

A negative-electrode substrate was prepared which was lead-plated in a thickness of approximately 100 microns in the same manner as in Example 7 except that a carbon fiber plate 0.3 mm thick was used instead of the SUS 430 stainless steel sheet. Then a negative electrode was prepared by depositing zinc on the surface thereof in the same manner as in Example 7. The electrolysis efficiency of zinc was calculated from the weight increase of the negative-electrode substrate of lead-plated carbon fiber given by the electrolytic zinc deposition, which shows that 900 mAH of zinc was contained and the deposition of zinc was nearly quantitative. A battery was prepared with this negative electrode and with the separator, the positive-electrode compound, and the electrolytic solution identical with the ones used in Example 7.

The battery was tested for cycle life under the same conditions as in Example 1 to examine the change of the battery capacity with repetition of the cycles. Table 1 shows the results collectively.

EXAMPLE 11

A sheet of SUS 430 stainless steel 0.3 mm thick, which had been adjusted to have an area of 12 cm$^2$, was connected to the negative pole (−) of a DC power source. A plate of lead having a purity of 98.5%, which had been adjusted to have an area of 24 cm,, was connected to the positive pole (+) of the DC power source. These plates were immersed in an aqueous solution containing 90 g/l of lead fluoborate, 60 g/l of fluoboric acid, 30 g/l of boric acid 0.5 g/l of peptone and 3 g/l of indium sulfate dissolved in pure water, and electroplating was conducted at a temperature of 25° C. at a current density of 25 mA/cm$^2$ for 1.5 hours, giving a negative-electrode substrate electroplated with lead alloy of approximately 130 microns thickness. On the surface of the substrate, zinc was deposited in the same manner as in Example 7 to provide a negative electrode. The electrolysis efficiency of zinc was calculated from the weight increase of the lead alloy-plated SUS 430 stainless steel sheet given by the electrolytic zinc deposition, which shows that 900 mAH of zinc was contained and the deposition of zinc was nearly quantitative. A battery was provided by using this electrode together with the separator, the positive-electrode compound, and the electrolyte solution identical with the ones in Example 7.

The battery was tested for cycle life under the same conditions as in Example 1 to examine the change of the battery capacity with repetition of the cycles. Table 1 shows the results collectively.

EXAMPLE 12

Lead having a thickness of 0.1 mm and a purity of 99.8% was used as the negative-electrode substrate. The surface was polished with #1500 sandpaper. Then the substrate was immersed in a mixture of acetic anhydride and acetone in a volume ratio of 3:1, and washed with water and acetone to remove fat. The substrate was adjusted to have a surface area of 12 cm$^2$, and thereon a paste prepared by mixing 98% by weight of granular zinc having an average particle size of 200 mesh and a purity of 99%, and 2% by weight of polyacrylic acid, and adding water was applied and the paste was dried, thus providing a negative electrode. This negative electrode was found to contain 900 mAH of zinc from the weight increase. A battery was provided by using this electrode together with the separator, the positive-electrode compound, and the electrolyte solution identical with the ones in Example 1.

The battery was tested for cycle life under the same conditions as in Example 1 to examine the change of the battery capacity with repetition of the cycles. Table 1 shows the results collectively.

EXAMPLE 13

A negative electrode was prepared in the same manner as in Example 12 except that a lead alloy 0.1 mm thick containing 4% by weight of antimony was used as the negative-electrode substrate. This negative electrode was found to contain 900 mAH of zinc from the weight increase. A battery was prepared by using this electrode together with the separator, the positive-electrode compound, and the electrolyte solution identical with the ones in Example 1.

The battery was tested for cycle life under the same conditions as in Example 1 to examine the change of the battery capacity with repetition of the cycles. Table 1 shows the results collectively.

EXAMPLE 14

A plate of SUS 430 stainless steel 0.3 mm thick, which had been adjusted to have an area of 12 cm$^2$, was connected to the negative pole (−) of a DC power source. A plate of lead having a purity of 98.5%, which had been adjusted to have an area of 24 cm$^2$, was connected to the positive pole (+) of the DC power source. These plates were immersed in an aqueous solution containing 90 g/l of lead fluoborate, 60 g/l of fluoboric acid, 30 g/l of boric acid, and 0.5 g/l of peptone dissolved in pure water, and electroplating was conducted at a temperature of 25° C. at a current density of 25 mA/cm$^2$ for 1.5 hours, giving a negative-electrode substrate electroplated with lead of approximately 130 microns thickness. This substrate was immersed in a mixed solution containing acetic anhydride and hydrogen peroxide in a volume ratio of 3:1, and was further washed with water and acetone to remove fat therefrom. On this substrate, a zinc plate having area of 12 cm$^2$, thickness of 13 microns and purity of 99% were placed, thus providing a negative electrode. A battery was prepared with this negative electrode and together with the separator, the positive-electrode compound, and the electrolytic solution identical with the ones in Example 7.

The battery was tested for cycle life under the same conditions as in Example 1 to examine the change of the battery capacity with repetition of the cycles. Table 1 shows the results collectively.

COMPARATIVE EXAMPLE 1

A single zinc plate 0.3 mm thick having a purity of 99% which had been washed with water, alcohol, and acetone was used as a negative electrode. With the negative electrode, having been adjusted to have an area of 12 cm$^2$, a battery was prepared together with a separator, a positive-electrode compound, and an electrolyte solution identical with the ones in Example 1.

The battery was tested for cycle life under the same conditions as in Example 1 to examine the change of the battery capacity with repetition of the cycles. Table 1 shows the results collectively.

This battery became incapable of being charged at the tenth cycle. Disassembly of the battery revealed that the zinc in the separator deposited out in a dendrite form to cause short-circuit to the positive-electrode side.

COMPARATIVE EXAMPLE 2

A plate of SUS 430 stainless steel 0.3 mm thick, having been washed with water, alcohol, and acetone was used as the negative-electrode substrate. The substrate, having been adjusted to have the area of 12 cm$^2$, was immersed in aqueous 2M zinc sulfate solution. By using a zinc plate having 99.9% purity as the counter electrode, a constant electric current of 60 mA was made to flow between the electrodes for 15 hours to deposit zinc on the surface of the negative-electrode substrate of the SUS 430 stainless steel sheet, thus providing a negative electrode. The electrolysis efficiency of zinc was calculated from the weight increase of the SUS 430 stainless steel sheet given by the electrolytic zinc deposition, which shows that 900 mAH of zinc was contained and the deposition of zinc was nearly quantitative. A battery was prepared with this negative electrode and with the separator, the positive-electrode compound, and the electrolytic solution identical with the ones in Example 7.

The battery was tested for cycle life under the same conditions as in Example 1 to examine the change of the battery capacity with repetition of the cycles. Table 1 shows the results collectively.

This battery deteriorated to result in rapid decrease of the battery capacity, becoming incapable of being charged before the fifteenth cycle. On disassembly of the battery, exfoliation of zinc from the negative-electrode substrate, and dendrite-form zinc deposition in the separator short-circuiting with the positive-electrode side were observed.

TABLE 1

| Repetition times | Examples | | | | | | | | | | | | | | Comparative examples | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 |
| 1 | 180 | 175 | 165 | 160 | 175 | 165 | 180 | 179 | 170 | 175 | 170 | 165 | 170 | 160 | 120 | 150 |
| 5 | 170 | 168 | 150 | 140 | 155 | 150 | 168 | 160 | 155 | 165 | 165 | 145 | 155 | 140 | 80 | 65 |
| 10 | 165 | 152 | 140 | 130 | 145 | 140 | 159 | 146 | 131 | 155 | 145 | 130 | 145 | 130 | 0 | 50 |
| 30 | 150 | 147 | 135 | 115 | 135 | 135 | 150 | 143 | 125 | 139 | 140 | 120 | 130 | 120 | | 8 |
| 50 | 148 | 140 | 125 | 105 | 125 | 125 | 140 | 133 | 115 | 127 | 120 | 100 | 110 | 110 | | |

Unit: mAh

As is obvious from the description above, the present invention provides a secondary battery having long cycle life as well as large discharge capacity since the dendrite short-circuit is effectively inhibited in a weakly acidic secondary battery by employing zinc as the negative-electrode material.

What is claimed is:

1. A secondary battery which comprises a positive-electrode material, an electrolyte solution, a negative-electrode material comprising zinc, and a negative-electrode substrate comprising lead or a lead alloy.

2. A secondary battery as claimed in claim 1, in which said lead alloy contains not less than about 95% of lead.

3. A secondary battery as claimed in claim 1, wherein said lead alloy comprises one or more of tin, indium, bismuth, silver, calcium and antimony in a total amount less than about 5%.

4. A secondary battery as claimed in claim 1, wherein said positive-electrode material is manganese dioxide and said electrolyte solution is an aqueous zinc sulfate solution.

5. A secondary battery as claimed in claim 1, wherein said negative-electrode material is zinc electrolytically deposited on the negative-electrode substrate.

6. A secondary battery as claimed in claim 1, wherein said negative-electrode substrate consists essentially of lead or a lead alloy.

7. A secondary battery as claimed in claim 1, wherein said negative-electrode substrate consists of lead or a lead alloy.

8. A secondary battery which comprises a positive-electrode material, an electrolyte solution, a negative-electrode material comprising zinc, and a negative-electrode substrate comprising an electro-conductive material, with the surface thereof coated with lead or a lead alloy.

9. A secondary battery as claimed in claim 8, wherein said lead alloy contains not less than about 95% of lead.

10. A secondary battery as claimed in claim 8, wherein said lead alloy comprises one or more of tin, indium, bismuth, silver, calcium and antimony in a total amount less than about 5%.

11. A secondary battery as claimed in claim 8, wherein said positive-electrode material is manganese dioxide and the electrolyte solution is an aqueous zinc sulfate solution.

12. A secondary battery as claimed in claim 8, wherein said negative-electrode material is zinc electrolytically deposited on the negative-electrode substrate.

13. A secondary battery as claimed in claim 8, wherein said electro-conductive material is selected from the group consisting of iron, iron alloys, nickel, nickel alloys, copper, copper alloys, carbon, and electro-conductive polymer comprising carbon as the main element.

14. A secondary battery as claimed in claim 8, wherein said negative-electrode substrate consists essentially of an electro-conductive material.

15. A secondary battery as claimed in claim 8, wherein said negative-electrode substrate consists of an electro-conductive material.

* * * * *